(12) United States Patent
Kennedy et al.

(10) Patent No.: US 6,852,804 B2
(45) Date of Patent: Feb. 8, 2005

(54) STAR BLOCK COPOLYMERS AND RELATED SYNTHETIC METHODS

(75) Inventors: Joseph P. Kennedy, Akron, OH (US); Ralf M. Peetz, Akron, OH (US); Ahmed F. Moustafa, Cairo (EG)

(73) Assignee: The University of Akron, Akron, OH (US)

(*) Notice: Subject to any disclaimer, the term of this patent is extended or adjusted under 35 U.S.C. 154(b) by 82 days.

(21) Appl. No.: 10/424,035

(22) Filed: Apr. 25, 2003

(65) Prior Publication Data

US 2004/0214951 A1 Oct. 28, 2004

(51) Int. Cl.$^7$ .............................................. C08F 297/00
(52) U.S. Cl. .................... 525/297; 525/244; 525/258; 525/266; 525/267; 525/289; 526/348.7
(58) Field of Search ................................ 525/289, 297, 525/244, 258, 266, 267; 526/348.7

(56) References Cited

U.S. PATENT DOCUMENTS

| | | | | |
|---|---|---|---|---|
| 4,599,384 A | * | 7/1986 | Farona et al. | 525/245 |
| 5,395,885 A | | 3/1995 | Kennedy et al. | 525/98 |
| 5,458,796 A | * | 10/1995 | Storey et al. | 508/591 |
| 5,516,854 A | | 5/1996 | Wardle et al. | 525/410 |
| 5,804,664 A | | 9/1998 | Kennedy et al. | 525/314 |
| 6,228,945 B1 | | 5/2001 | Kennedy et al. | 525/241 |
| 6,294,616 B1 | * | 9/2001 | Rhodes et al. | 525/332.1 |

OTHER PUBLICATIONS

Sherman, M.A., Kennedy, J.P., *J. Poly. Sci.*, Part A., Polym. Chem. 1998, 36, 1891–1899.

Chen, C., J. Si, and J. Kennedy, "Living Carbocationic Polymerization. XLIX. Two–Stage Living Polymerization of Isobutylene to Di–tert–Chlorine Telechelic Polyisobutylene", *J.M.S.–Pure Appl. Chem.*, A29(8), 669 (1992).

Kennedy, J.P., Marechal, E., in *Carbocationic Polymerization*; wiley,: New York, 1982, p. 106.

Kennedy, J.P., Smith, R., *J. Polym. Sci. Polym. Chem. Ed.* 1980 18 1523–1537.

Jacob, S., Majoros, I, Kennedy, J.P., *Polym. Bull.*, 1998, 40, 127–134.

Jacob, S., Kennedy, J.P., *Adv. Polym. Sci.*, 1999, 146, 1–38.

Cationic Polymerization of Norbornadiene, Ralf M. Peetz, Ahmed F. Moustafa and Joseph P. Kennedy, Institute of Polymer Science, The University of Akron, Part I of the series, (undated).

Cationic Polymerization of Norbornadiene, Ralf M. Peetz, Ahmed F. Moustafa and Joseph P. Kennedy, Institute of Polymer Science, The University of Akron, Part II of the series, (undated).

* cited by examiner

*Primary Examiner*—Fred Teskin
(74) *Attorney, Agent, or Firm*—Roetzel & Andress

(57) ABSTRACT

Block copolymers having a polyisobutylene segment and a polycycloaliphatic diene polymer segment are presented. Star block copolymers with 2 to 16 block copolymer arms, wherein each of the arms has a polyisobutylene segment and a polycycloaliphatic diene polymer segment, are presented. The star block copolymers are synthesized via the "core first" method.

17 Claims, 11 Drawing Sheets

STAR BLOCK COPOLYMERS AND RELATED SYNTHETIC METHODS

The research disclosed in this application was at least partially supported by the National Science Foundation under Grant 99-88808.

TECHNICAL FIELD

This invention generally relates to block copolymers, star block copolymers, and related synthetic methods. Specifically, this invention is directed to block copolymers having at least a polycycloaliphatic diene polymer segment and a polyisobutylene segment. Additionally, this invention is directed to star block copolymers having 2–16 copolymeric arms wherein each arm has a polycycloaliphatic diene polymer segment and a polyisobutylene segment.

BACKGROUND OF THE INVENTION

The synthesis of star polymers is growing in commercial interest. Star polymers have many applications such as, inter alia, surfactants, thermoplastic elastomers, lubricants, rheology modifiers, and viscosity modifiers or control agents. In fact, some star polymers are now considered by many to be state-of-the-art viscosity modifiers and oil additives.

Synthesizing star polymers having a narrow polydispersity (i.e., uniform arm length) and a readily determinable number of arms and arm molecular weights is a long standing need. Considerable efforts have been made to prepare star-like structures having arms made of various materials and ranging in number from 2 to greater than 250. To date, three major techniques or processes have been described and/or used for synthesizing star polymers. These three techniques are typically distinguished from each other by (1) the use of multifunctional linking agents (also known as the "core and arm first" method); (2) the sequential copolymerization/linking with a divinyl monomer (also known as the "arm first" method); and (3) the use of multifunctional initiators (also known as the "core first" method).

With respect to the "core and arm first method," multifunctional linking agents have proven useful in conjunction with anionic-polymerization techniques for preparing homo-, block-, and hetero-arm star polymers. Multifunctional linking agents have also been used in conjunction with carbocationic polymerization techniques to prepare four-arm poly(isobutyl vinyl ether) stars, and multi-arm polyisobutylene stars. In the latter instance, the polyisobutylene stars can be prepared by the hydrosilation of allyl-terminated polyisobutylenes with siloxane cores.

Linking living-polymer chains with divinyl monomer(s) is also well known and has been used for the synthesis of multi-arm stars by anionic, cationic, and group-transfer polymerization techniques.

Using multifunctional initiators for the synthesis of multi-arm star polymers has not, however, been as thoroughly developed in certain respects. For anionic polymerization systems, the use of multifunctional initiators is somewhat limited due to relatively poor initiator solubility in hydrocarbon solvents. However, at least two studies have shown that hydrocarbon-swollen polydivinylbenzene can be used as a multifunctional anionic-polymerization initiator. Unfortunately, the polydispersity of the star polymers was rather broad in each of these studies. Other studies have used a hydrocarbon-soluble trifunctional initiator for preparing homo-, block-, and functionalized star polymers.

The solubility problems of multifunctional initiators are generally less severe with carbocationic polymerization systems. And carbocationic polymerization techniques are readily employable in synthesizing multi-arm stars.

Among the many advantages of using multifunctional initiators with carbocationic polymerizable monomers such as isobutylene, is that the resultant stars are "directly telechelic." By directly telechelic, it is meant that the resultant star will have a functional group at the end of each arm upon terminating the polymerization reaction. That is, chain-end functionality of the arms is preserved during formation of the star. A chain-end functionality is also known as the functionality at a terminus of an arm. In comparison, other techniques for synthesizing star polymers require at least an additional processing step to provide a chain-end functionality.

There has been a growing interest in star polymers that have multiple polyisobutylene (PIB) arms. For example, Kennedy et al. U.S. Pat. No. 5,395,885 describes the synthesis of star polymers having multiple PIB arms and polydivinylbenzene (PDVB) cores using cationic "arm-first" synthesis techniques. Because the structure of PIB is readily characterized and contains no sites of unsaturation, these PIB-based stars are believed to be useful for a variety of applications such as motor-oil additives and viscosity-index improvers. However, their potential is still being evaluated and tested, and in motor-oil additives where certain properties such as, for example, sensitivity to oxidation, is of critical importance, the possibility remains that, because of using crosslinked aromatic cores such as PDVB, the PIB-PDVB stars may not be highly desirable for such use.

SUMMARY OF INVENTION

Thus, it is therefore, an aspect of the present invention to provide a block copolymer having a first polymer segment of polyisobutylene and a second polymer segment of a polycycloaliphatic diene polymer.

It is another aspect of the present invention to provide a star block copolymer having an aromatic core component and N number of arms connected to said core component, wherein each arm is a block copolymer having a polyisobutylene segment and a polycycloaliphatic diene polymer segment and wherein all of the arms are the same.

It is still another aspect of the present invention to provide a process of synthesizing a star block copolymer comprising the steps of forming an inner block by cationic polymerization of either isobutylene or a polycycloaliphatic diene from a multifunctional initiator; and forming an outer block, using the isobutylene or the polycycloaliphatic diene that was not used in forming said inner block, by cationic polymerization of said isobutylene monomer or said polycycloaliphatic diene monomer from a terminus of said inner block.

The present invention advantageously provides for block copolymers having at least a polyisobutylene segment and a polycycloaliphatic diene polymer segment. Further, this invention provides for star block copolymers wherein each arm of a star has at least a polyisobutylene segment and a polycycloaliphatic diene polymer segment.

BRIEF DESCRIPTION OF THE DRAWINGS

For a complete understanding of the methods, structure, and characterization of the invention, reference should be made to the following accompanying drawings wherein.

PREFERRED EMBODIMENT FOR CARRYING OUT THE INVENTION

Figure 1:
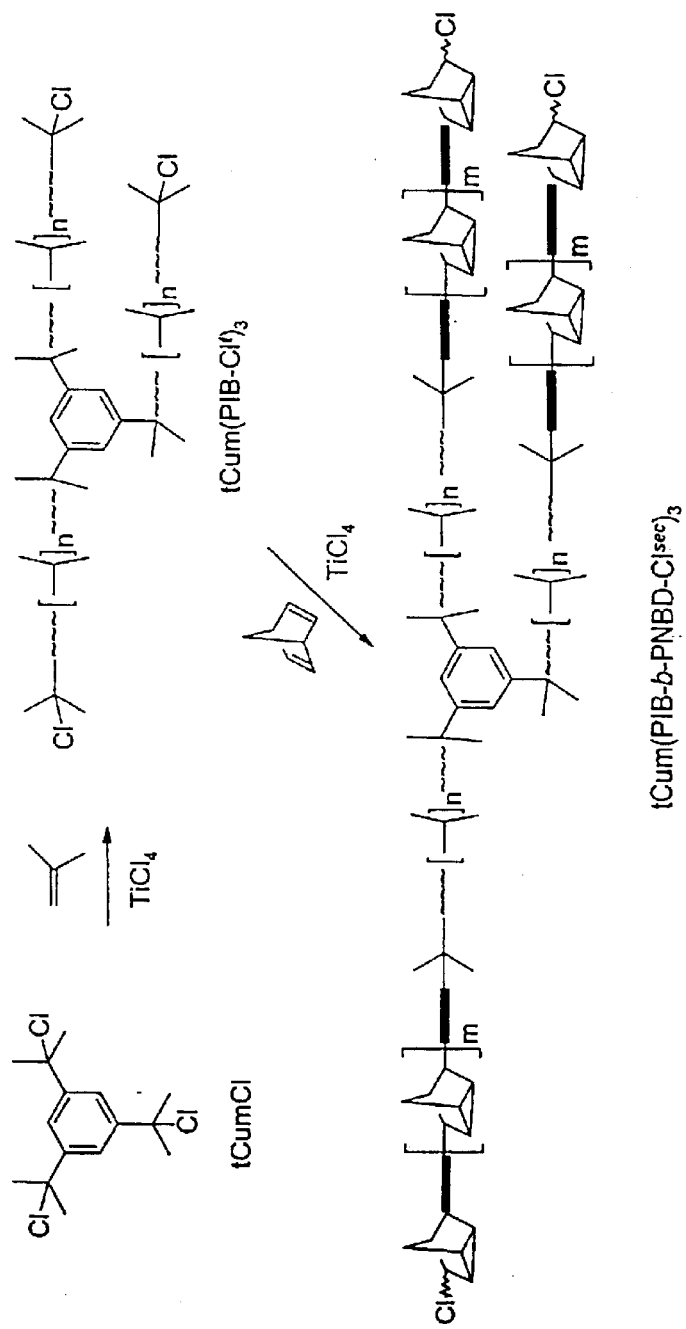
FIG. 1 is a synthesis strategy for tCum(PIB-b-PNBD)$_3$

Broadly, the present invention is directed toward star block copolymers (stars), block copolymers, and related synthetic methods. Specifically, each star is made up of an aromatic core component and block copolymer arms, wherein all of the arms are the same block copolymer.

A characteristic that is common among this invention's block copolymers and stars is the presence of at least a polycycloaliphatic-diene polymer segment and a polyisobutylene polymer segment in each. As provided hereinbelow, the terms "polymer segment" and "polymer block" will be used interchangeably to describe sections of a block copolymer that are made up of the same polymeric unit. Regarding stars, it is the block-copolymer arms that are made up of polymer segments.

As mentioned above, it will be appreciated that with respect to any one star, all of the arms thereon are the same block copolymer. Consequently, a star will not have a combination different copolymer arms. There will be no instance of a star wherein any one arm is a different copolymer than any other arm of the star. In other words, in any particular star, every arm of that star will have the same inner block and same outer block. "Inner block" refers to the polymer segment that is attached directly to the core. "Outer block" refers to the polymer segment that is attached to the terminus of the inner block. As a nonlimiting example, in a star having diblock copolymeric arms that are all polyisoburylene-b-polynorbornadiene (PIB-b-PNBD) wherein PIB is directly attached to the core, PIB is the inner block and PNBD is the outer block.

Stars have aromatic core components. Where a star has a dicumyl core, the star will have two arms extending therefrom. Where tricumyl is the core, three arms will extend therefrom. Where calixarene is the core, 4–16 arms will extend therefrom. Hence, the term "star polymer" is used to describe compositions that have multiple arms extending from a central core.

Stars have block copolymer arms radiating off of the core component. As mentioned hereinabove, the block copolymer arms have at least a polyisobutylene segment and at least a polycycloaliphatic diene polymer segment. Within a star, all of the arms are the same and either of these segments can be employed as the inner or outer segment. However, within a star, neither of these segments is employed as both the inner and outer block. Therefore, an arm is either a PIB-b-polycycloaliphatic diene polymer or a polycycloaliphatic diene polymer-PIB block copolymer.

A block copolymer of this invention has a first segment that is a polycycloaliphatic diene polymer and a second segment that is polyisobutylene. The designation of first and second are not intended to provide any suggestion as to the position of the segments within the block copolymer, i.e., these designations should not be understood as describing positional orientation. Instead, they indicate that two distinct polymer segments are present within the copolymer. Although any polycycloaliphatic diene polymer can be employed in the block copolymers, polynorbornadiene is preferred.

The number of polymer segments within a particular block copolymer is in no way limited, and therefore any number of polymer segments can be employed. In one embodiment, two polymer segments are present. In another embodiment, three polymer segments are present. In yet another embodiment, more than four segments are present.

The synthesis of stars has been accomplished by using the "core first" method wherein a multi-functional initiator is used, in conjunction with at least one Freidel-Crafts acid, which acts as a co-initiator, to induce the well-known carbocationic polymerization of isobutylene or polycycloaliphatic diene monomers. More specifically, it has been found that the use of tert-halogen, tert-hydroxy, and tert-methoxy derivatives of the dicumyl, tricumyl, and calixarene initiators and at least one Friedel-Crafts acid co-initiator such as, for example, BCl$_3$, TiCl$_4$, and mixtures thereof, with at least a portion of a carbocationic polymerizable monomer that is either isobutylene or a polycycloaliphatic diene, in at least one solvent at cryogenic temperatures and in the presence of an electron-pair donor and a proton scavenger produces the inner block of each of the arms. The outer block of each of the copolymeric arms is synthesized in a similar fassion by subsequently polymerizing a different monomer, which is isobutylene or a polycycloaliphatic diene, onto the terminus of the inner block. Moreover, the resultant block copolymer arms are directly telechelic, which means that the terminus of the arms remain functionalized upon termination of polymerization.

In a preferred embodiment, the polycycloaliphatic diene monomer is norbornadiene.

Where a multifunctional initiator is used, the star will have a number of arms equal to the number of functional sites on the initiator. Therefore, a difunctional initiator will yield a star block copolymer having two arms. It will be appreciated that difunctional initiators suitable for use according to the concepts of the present invention are the tert-halogen, tert-OH, and tert-methoxy derivatives of dicumyl, i.e. phenyl-1,3-di(–2-propyl) fragment, represented as:

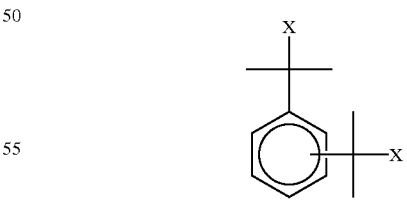

wherein X is independently selected and is a hydroxy, methoxy, or a halogen functionality. The preferred halogen functionality is chlorine, and dicumyl chloride (dCumCl) can be obtained commercially or synthesized by well-known methods.

Similarly, a tri-functional initiator will yield a star block copolymer having three arms. It will be appreciated that tri-functional initiators suitable for use according to the concepts of the present invention are the tert-halogen, tert- OH, and tert-methoxy derivatives of tricumyl, i.e. phenyl-1,3,5-tris(-2-propyl) fragment, represented as:

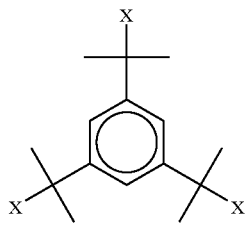

wherein each X is independently selected and is a hydroxy, methoxy, or halogen functionality. The preferred halogen functionality is chlorine, and the synthesis of tricumyl chloride (tCumCl) has been described by Sherman, M. A., Kennedy, J. P., *J. Poly. Sci.*, Part A, Polym. Chem. 1998, 36, 1891, which is herein incorporated by reference.

Where calixarene derivatives are used as initiators, the number of block-copolymer arms, N, will depend upon the number of cyclic units, n, in the calixarene initiator since each cyclic unit has exactly one functional site. It is conventional in the art to refer to the number of cyclic units and, therefore, the equivalent number of functional sites on a calixarene by denoting the compound as calix[n]arene where n equals the number of cyclic units.

In the present invention, the tert-halogen, tert-OH, and tert-methoxy derivatives of calix[n]arene where n=4 to 16 are used as multifunctional initiators. That is, the multifunctional initiators suitable for use according to the concepts of the present invention are the above-mentioned derivatives of calix[n]arene, represented as:

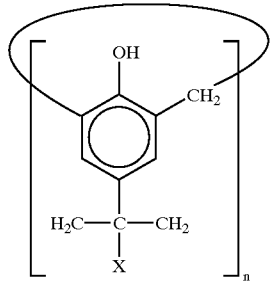

wherein each X is independently selected and is a hydroxy, methoxy, or halogen functionality, and wherein n=4 to 16. The preferred halogen functionality is chlorine. The synthesis of calix[n]arene is well known and described in U.S. Pat. No. 5,804,664, which is incorporated herein by reference.

With respect to co-initiators, at least one Friedel-Crafts acid may be used as a co-initiator in the polymerization process, and any known Friedel-Crafts acid suitable as a co-initiator for carrying out the polymerization reaction may be used in the present invention. Although both $BCl_3$ and $TiCl_4$ are believed satisfactory when used alone under certain reaction conditions, polymerization is especially satisfactory in the presence of $BCl_3$ and $TiCl_4$, and well-defined stars having close to theoretical composition and molecular weights can be synthesized. Especially preferred is the use of $BCl_3$ first and then $TiCl_4$ in a two-stage process, discussed hereinbelow.

Isobutylene and polycycloaliphatic diene monomers are employed in synthesizing stars. Isobutylene is well known in the art, and any polycycloaliphatic diene monomer can be employed. Norbornadiene is preferred and can be represented as follows:

Furthermore, at least one solvent should be used in synthesizing either a block copolymer or star block copolymer. A preferred solvent is capable of dissolving the initiator, co-initiator, monomer, and resultant copolymer. Nonlimiting examples of solvents suitable for use in the present invention are chlorinated alkanes, $CH_2Cl_2$, $CHCl_3$, hexanes, carbon dioxide, and mixtures thereof, with $CH_3Cl$ being preferred under certain conditions.

The polymerization reaction is carried out in the presence of an electron-pair donor and a proton scavenger. Any known electron-pair donor and proton scavenger with the other constituents of the polymerization process as described herein may be used. Nonlimiting preferred electron-pair donors are, inter alia, dimethylacetamide (DMA), dimethyl sulfoxide (DMSO), dimethylphthalate (DMP), pyridine and its derivatives, triethylamine (TEA), with DMA being most preferred. Nonlimiting examples of proton scavengers include di-tert-butylpyridine (DtBP) and its methyl derivatives (DtBMP) with DtBP being most preferred.

In an embodiment for preparing a PIB inner block, polymerization is generally carried out in two stages within a single reactor. In a first stage, an initiator is dissolved in a first solvent, followed sequentially by a stoichiometric portion of isobutylene, and a first Friedel-Crafts acid to induce polymerization at a cryogenic temperature in the presence of an electron-pair donor and a proton scavenger. Then, in a second stage, an additional amount of the first solvent or a second and/or additional solvent(s), the remaining portion of isobutylene, and an additional and/or a second Freidel-Crafts acid are added in sequence. Quenching or otherwise terminating the polymerization reaction can be accomplished by adding a known terminating agent, such as methanol, to the solution. A further description of this embodiment is set forth in Chen, C., J. Si, and J. Kennedy, "Living Carbocationic Polymerization. XLIX. Two-Stage Living Polymerization of Isobutylene to Di-tert-Chlorine Telechelic Polyisobutylene", *J.M.S.—Pure Appl. Chem.*, A29(8), 669 (1992), the disclosure of which is incorporated herein by reference.

In an embodiment for preparing a polycycloaliphatic diene, e.g. polynorbornadiene (PNBD), outer block, polymerization is carried out as follows. A star polymer having PIB arms, wherein each arm has a tert-halogen, tert-OH, or tert-methoxy chain-end functionality, is dissolved in a solvent at cryogenic temperatures to which additional solvent is added dropwise. To this solution an electron-pair donor and proton scavenger is added along with stoichiometric portions of the polycycloaliphatic diene monomer. Polymerization of the polycycloaliphatic diene monomer is initiated by adding sequential amounts of a Friedel-Crafts acid, and it is then terminated by quenching with prechilled methanol.

In another embodiment of the present invention, a polycycloaliphatic diene inner block of a star is synthesized generally as follows. A stoichiometric portion of the polycycloaliphatic diene monomer is dissolved in a solvent followed by the addition of a multi-functional initiator and an electron-pair donor and a proton scavenger. The solution is then cooled and stirred at −60° C. Polymerization is initiated by the addition of a coinitiator. Polymerization proceeds and is subsequently terminated by quenching with precooled methanol. A star having a tricumyl core, three polynorbornadiene inner blocks, and sec-Cl functionalities (tCum(PNBD-Cl$^{sec}$)$_3$) for example, can be synthesized by this method.

Synthesizing the PIB outer block of a star PNBD-b-PIB copolymer can generally be carried out according to the following embodiment. A star polymer having PNBD arms wherein each arm has a sec-Cl functionality located at its terminus, is dissolved in a solvent along with an electron-pair donor and proton scavenger. A quantity of isobutylene monomer is then added to the solution along with a Friedel-Crafts acid co-initiator in order to initiate polymerization. After approximately five minutes, a precooled hydrocarbon solvent and an additional amount of the Friedel-Crafts acid is added to the solution. Isobutylene polymerization is then terminated by quenching with prechilled methanol. It is appreciated that the PNBD-Cl$^{sec}$ terminus supports isobutylene polymerization although the structurally similar isopropyl chloride is an inefficient initiator under similar conditions as described by Kennedy, J. P.; Marechal, E., in *Carbocationic Polymerization*; wiley: New York, 1982, p. 106.

As noted hereinabove, this invention's star block-copolymers are directly telechelic. Where the terminating agent employed to quench the polymerization reaction is methanol, it will be appreciated that the terminus of each block-copolymer arm of the resultant star block copolymers will preferably have a tert-Cl or sec-Cl functional group. When such is the case, these tert-Cl functionalities can easily be further functionalized by using various well-known techniques such as dehydrochlorination or substitution of the Cl functionality.

Thus, it will be appreciated that, in a preferred embodiment of the present invention, the synthesis of well-defined star block copolymers is accomplished by the use of tert-halogen, tert-hydroxy, and tert-methoxy derivatives of dicumyl, tricumyl, and calix[n]arene (n=4 to 16) as multifunctional initiators, in conjunction with at least one Friedel-Crafts acid as a co-initiator, to induce the living carbocationic polymerization of this invention's copolymeric arms having inner and outer blocks that are different from each other. Each arm has a PIB segment and a polycycloaliphatic diene polymer segment. The polymerization is carried out in at least one solvent at a cryogenic temperature and in the presence of an electron-pair donor and a proton scavenger.

In order to demonstrate practice of the present invention, star block-copolymer compositions having polyisobutylene-b-polynorbornadiene (PIB-b-PNBD) arms and star block copolymers having polynorbornadiene-b-polyisobutylene (PNBD-b-PIB) arms, both of which having a tricumyl core, were prepared.

These examples should not be construed as limiting the scope of the invention in any way, and the scope of the invention is determined by the claims presented herein.

EXAMPLES

Two structurally closely related three-arm star block copolymers have been synthesized and characterized: tCum (PIB-b-PNBD)$_3$ and tCum(PNBD-b-PIB)$_3$, where tCum (=tricumyl) stands for the phenyl-1,3,5-tris(-2-propyl) fragment and PIB and PNBD are, respectively, polyisobutylene and polynorbornadiene. The syntheses were accomplished in two stages: 1. Preparation of the first (or inner) polymer block fitted with appropriate chlorine termini capable of initiating the polymerization of the second (or outer) polymer block by using TiCl$_4$, and 2.

Mediating the polymerization of the second block. Thus, the synthesis of tCum(PIB-b-PNBD)$_3$ was effected with tCum(PIB-Cl$^t$)$_3$ ($\overline{M}_n$=102,000 g/mol) by the use of TiCl$_4$ and CH$_3$Cl/CHCl$_3$ 30/70 solvent mixtures at −35° C. PNBD homopolymer contamination formed by chain transfer was removed by selective precipitation.

According to GPC, the $\overline{M}_n$'s of the star blocks were in the 107,300 to 109,200 g/mol range. NMR spectroscopy (750 MHz) was used to determine structures and molecular weights. DSC indicated two $T_g$'s, one each for the PIB (−65° C.) and PNBD (232° C.) phases. TGA thermograms showed 5% weight loss at 293° C. in air and at 352° C. in N$_2$. The synthesis of tCum(PNBD-b-PIB), was achieved by initiating IB polymerization with tCum(PNBD-Cl$^{sec}$)$_3$ ($\overline{M}_n$=2,900 g/mol) by the use of TiCl$_4$ in CH$_3$Cl at −60° C. The DSC of this star-block copolymer ($\overline{M}_n$=14,200 g/mol) also showed two $T_g$'s, i.e., at −67° C. and 228° C. for the PIB and PNBD segments respectively. It is of interest that the sec-chlorine terminus of the PNBD readily initiates IB polymerization.

Synthesis of tCum(PIB-b-PNBD)$_3$

The three-arm star Cl$^t$-tritelechelic tCum(PIB-Cl)$_3$ was prepared by living isobutylene polymerization using the tCumCl/TiCl$_4$/DMA/DtBP/−80° C. system. The synthesis tCum(PIB-Cl$^t$)$_3$ is known and described by Faust, R.; Kennedy, J. P., *J. Poly. Sci.*; Part A Polym. Chem. 1987, 25, 1847; and Nagy, A.; Faust, R.; Kennedy J. P, *Pulym Bull,* 1985, 13, 97, which are incorporated herein by reference. A representative blocking of NBD was carried out as follows: 5 g (0.049 mmol) of tCum(PIB-Cl)$_3$ ($\overline{M}_n$~102,000 g/mol, $\overline{M}_w/\overline{M}_n$=1.03) were dissolved in 500 mL CHCl$_3$. At −35° C., 200 ml CH$_3$Cl were added dropwise (to avoid precipitation). Thereafter to the stirred solution were added 0.5 g (2.4 mmol) DtBMP, 1 mL (10.7 mmol) DMA, and 20 mL (186 mmol) NBD. Blocking was initiated by the addition of 25 mL (228 mmol) TiCl$_4$, and after 1 h, by the addition of another 25 mL (228 mmol) TiCl$_4$. After 10 h stirring, the outer polymer block polymerization was quenched with prechilled methanol. The precipitated product was dissolved in hexanes, washed three times with water, three times with methanol and again three times with water. The solution was dried over MgSO$_4$ overnight and the solvent was removed. The polymer was further purified by dissolving in THF and filtering through 0.45 μm porous Whatman filters until a clear solution was obtained. To remove the PNBD contaminant, the clear THF solution was concentrated and twice precipitated in 1,2 dichloroethane at 0° C. The block copolymer was dried in a vacuum oven at 40° C. for 48 h, then repeatedly freeze dried (liquid N$_2$, vacuum for 4 h). Yield: 4.2 g transparent clear polymer $\overline{M}_n$~109,200 g/mol, $\overline{M}_w/\overline{M}_n$~1.01. Molecular weight $\overline{M}_n$, $\overline{M}_w/\overline{M}_n$, and functionality were determined by GPC (LLS-detector) and $^1$H-NMR-spectroscopy.

The synthesis of tricumylchloride (tCumCl) has been described by Sherman, M. A.; Kennedy, J. P. in the *Journal of Polymer Science*, Part A, Polymer Chemistry, 1998, 36, 1891; which is herein incorporated by reference.

Bicyclo[2.2.1]hepta-2,5-diene (common name norbornadiene, NBD), N,N-dimethylacetamide (DMA), 2,6-di-tert-butylpyridine (DtBP), 2,6-di-tert-butyl-4-methylpyridine (DtBMP), titanium tetrachloride (all from Aldrich) were used as received. CH$_3$OH, CH$_2$Cl$_2$, CHCl$_3$, ClCH$_2$CH$_2$Cl, and hexanes were purchased from Fisher. Isobutylene (IB, CP grade) and methyl chloride (Matheson) were dried by passing the gases through columns packed with BaO, Drierite, and molecular sieves. Hexanes, 1,2-dichloroethane and CH$_2$Cl$_2$ were dried by refluxing over CaH$_2$ (Aldrich) for four days and distilled before use. CHCl$_3$ was dried by refluxing over LiAlH$_4$ (Aldrich) for 48 h and distilled before use.

Synthesis of tCum(PNBD-b-PIB)$_3$

The synthesis of the tCum(PNBD-Cl)$_3$ was carried out by initiating the polymerization of NBD with the tCumCl/TiCl$_4$ system as follows. In a three-neck round bottom flask equipped with a mechanical stirrer were placed 300 mL CH$_3$Cl, mL (186 mmol) of NBD, 0.76 g (2.5 mmol) tCumCl, 0.54 g (2.6 mmol) DtBMP, and 0.5 mL (5.4 mmol) DMA. The system was cooled and stirred at −60° C., and the polymerization was initiated by the addition of 16 mL (146 mmol) TiCl$_4$. After 2 h the reaction was quenched by precooled methanol. The CH$_3$Cl was evaporated, the product dissolved in a small amount of THF, and the solution precipitated in methanol. Dissolution/precipitation was repeated. Yield: 13.5 g tCum(PNBD-Cl)$_3$ $\overline{M}_n$∼2,900 g/mol, $\overline{M}_w/\overline{M}_n$∼1.93 (R1, against PIB standards).

Blocking of the outer IB polymer block was carried out as follows: To a three-neck round bottom flask at −60° C., charged with 200 mL CH$_3$Cl and 2 g (0.69 mmol) tCum (PNBD-Cl)$_3$ ($\overline{M}_n$∼2,900 g/mol, $\overline{M}_w/\overline{M}_n$∼1.93) were added 0.5 mL (5.4 mmol) DMA, 0.45 g (2.2 mmol) DtBMP and 90 mL (1.2 mol) IB, followed by 15 mL (137 mmol) TiCl$_4$. After 5 minutes 300 mL pre-cooled hexanes and 15 mL (137 mmol) TiCl$_4$ were added. After 1 h the polymerization was quenched with 50 mL prechilled methanol. The solvents were evaporated, the polymer was dissolved in hexanes, washed with water, methanol, and again with water, and dried over MgSO$_4$. The solvent was evaporated, redissolved in THF, the solution passed through a 0.45 μL Whatman filter, precipitated in methanol, and recovered. Yield: 47 g tCum(PNBD-b-PIB)$_3$ $\overline{M}_n$∼14,200 g/mol, $\overline{M}_w/\overline{M}_n$∼1.99 (RI, against PIB standards).

The materials employed in synthesizing tCum(PNBD-b-PIB)$_3$ are as described above with respect to the synthesis of tCum(PIB-b-PNBD)$_3$.

Equipment and Characterization Procedures
Synthesis Procedures

Syntheses of star block-copolymers were carried out by using a stainless steel enclosure under a dry N$_2$ atmosphere as described by Kennedy, J. P.; R. Smith, *J. Polym. Sci. Polym. Chem. Ed.* 1980, 18, 1523; which is incorporated herein by reference.

Gel Permeation Chromatography

Molecular weights (number average $\overline{M}_n$, weight average $\overline{M}_w$) and molecular weight distributions (MWD; $\overline{M}_w/\overline{M}_n$) were obtained by a Waters GPC instrument equipped with a series of five Styragel columns (HR 0.5, HR 1, HR 3, HR 4, HR 5; Waters) calibrated with narrow MWD PIB standards, a refractive index detector (Waters 410 differential refractometer), a dual λ UV absorbance detector (Waters 2487) and a laser light scattering (LLS) detector (Minidawn, Wyatt Technology). Astra software (Version 4.0, Wyatt Technology) was used for data evaluation. The flow rate was 1 mL of THF/min.

NMR

One dimensional (1D) $^1$H- and $^{13}$C-NMR spectra were aquired on a Varian Unity plus 750 MHz Spectrometer at 25° C. A two-dimensional (2D) $^1$H—$^{13}$C correlation spectrum was obtained by a pulsed field gradient assisted HMQC (Heteronuclear multiple quantum coherence) experiment under similar conditions. Sample concentrations were 25 mg/0.75 mL in CDCl$_3$ for proton measurements on star and star-block polymers.

Thermal Properties

Glass transition temperatures (T$_g$'s) were determined with a differential scanning calorimeter (Model DSC 2910, Dupont Instruments) under N$_2$. Samples were heated to 300° C. at 10° C./min to remove thermal history effects and cooled to −100° C. Thermograms were recorded by reheating to 300° C. at 10° C./min. Thermal degradation was studied with a thermogravimetric analyzer (Model HI-Res TGA 2950) under N$_2$ and air by heating samples from ambient to 700° C. at 10° C./min.

Results and DISCUSSION

Synthesis and Characterization of tCum(PIB-b-PNBD)$_3$

Synthesis

FIG. 1 outlines a basic strategy for the synthesis of tCum(PIB-b-PNBD)$_3$ and shows the structure of the three-arm star block-copolymer. It has been demonstrated and it is also well known that the TMPCl/TiCl$_4$ combination efficiently initiates NBD polymerization.

tCum(PIB-Cl$^t$)$_3$ macroinitiator was then prepared using well-documented techniques and used in conjunction with TiCl$_4$ to induce the polymerization of NBD. Preliminary experiments showed that mixtures of polar/nonpolar solvents (i.e., ∼50/50 (v/v) CH$_3$Cl/nC$_6$H$_{14}$, CH$_3$Cl/methylcyclohexane (MeCH), CH$_2$Cl$_2$/nC$_6$H$_{14}$, CH$_2$Cl$_2$/MeCH) conventionally used for the preparation of PIB blocks covalently linked to glassy blocks, as described by Kennedy, J. P.; Ivan, B.; in *Designed Polymers by Corbocationic Macromolecular Engineering: Theory and Practice*; Hanser: Munich, 1992; Ch. III. 3. are unsuitable for the envisioned synthesis because NBD polymerizations do not proceed in the presence of even small amounts (∼20%) of hexanes or MeCH and because PNBD is insoluble in these aliphatic hydrocarbons. Extended orienting experiments with various solvents and solvent mixtures indicated that under well-defined conditions 30/70 (v/v) CH$_3$Cl/CHCl$_3$ mixtures at −35° C. gave satisfactory blocking. CHCl$_3$ is a solvent for high molecular weight narrow polydispersity PIB and keeps the tCum(PIB-b-PNBD)$_3$ in solution at −35° C. even in the presence of 30% CH$_3$Cl. At higher CH$_3$Cl concentrations (i.e., 40/60 (v/v) CH$_3$Cl/CHCl$_3$) or at lower temperatures (i.e., −45 to −55° C.) the PIB prepolymer precipitated from solution. Thus, satisfactory star-block syntheses could be effected with 30/70 (v/v) CH$_3$Cl/CHCl$_3$ at −35° C.; under these conditions all the species of a charge (i.e., the prepolymer, the star-block product, and PNBD byproduct (see below)) are in solution, and the 30% CH$_3$Cl provides sufficient polarity for cationic blocking.

In a representative synthesis 25 mL precooled TiCl$_4$ were added to a mixture of 5 g prepolymer ($\overline{M}_n$∼102,000 g/mol, $\overline{M}_w/\overline{M}_n$=1.03), 20 mL NBD, 0.5 g DtBMP, 1 mL DMA in 700 mL 30/70 (v/v) CH$_3$Cl/CHCl$_3$ at −35° C. After 1 h additional 25 mL precooled TiCl$_4$ were added. The reaction was quenched after 10 h by precooled methanol. Under similar conditions, blocking of PNBD did not occur using 50/50 (v/v) mixtures of hexanes/CH$_3$Cl, methylcyclohexane/CH$_3$Cl, and CH$_2$Cl$_2$/CH$_3$Cl. The solubility of the macroinitiator was much lower in CH$_2$Cl$_2$ than in hexanes, MeCH or CHCl$_3$.

TABLE I

Blocking NBD from tCum(PIB-Cl)$_3$

| | Conditions | Results | | |
|---|---|---|---|---|
| # | [tCum(PIB-Cl)$_3$]/[NBD]/ [TiCl$_4$]/[DtBMP]/[DMA] (mmol/L), solvent v/v, T (° C.), t (h) | Star-Block g | $\overline{M}_n$ g/mol | $\overline{M}_w/\overline{M}_n$ |
| 1 | 0.07$^a$/77/651/15.3/3.4, CHCl$_3$/CH$_3$Cl 70/30, −35, 10 | No significant blocking | | |
| 2 | 0.07$^a$/266/651/15.3/3.4, CHCl$_3$/CH$_3$Cl 70/30, −35, 10 | 3.7$^c$ (69%) | 108800 | 1.01 |
| 3 | | 4.2$^c$ (78%) | 109200 | 1.01 |
| 4 | | 3.9$^c$ (72%) | 107300 | 1.01 |

TABLE I-continued

Blocking NBD from tCum(PIB-Cl)₃

| # | Conditions [tCum(PIB-Cl)₃]/[NBD]/ [TiCl₄]/[DtBMP]/[DMA] (mmol/L), solvent v/v, T (° C.), t (h) | Results Star-Block g | $\overline{M}_n$ g/mol | $\overline{M}_w/\overline{M}_n$ |
|---|---|---|---|---|
| 5 | 0.285$^b$/463/364/4.8/22, CHCl₃/CH₃Cl 50/50, −80, 1 | No blocking | | |
| 6 | 0.171$^b$/463/447/4.8/22, CHCl₃/CH₃Cl 50/50, −60, 2 | | | |
| 7 | 0.1$^b$/463/447/4.8/22, CHCl₃/MeCH 50/50, −40, 4 | | | |

$^a$tCum(PIB-Cl)₃ 102,000 g/mol (GPC - LLS)
$^b$tCum(PIB-Cl)₃ 42,000 g/mol (GPC - LLS)
$^c$after workup (see Experimental), yield based on tCum(PIB-Cl)₃

Table 1 lists the experimental conditions and results of some blocking experiments. Satisfactory blocking was obtained under the conditions of Expts 2–4: The molecular weight of the prepolymer ($\overline{M}_n$=102,000 g/mol) increased to $\overline{M}_n$=107,300–109,200 g/mol with exceptionally low values for $\overline{M}_w/\overline{M}_n$.

Without being bound to theory, in Expt 1 the concentration of NBD was too low to effect blocking, in Expts 5 and 6 the reaction time was too short, and Expt 7 the solvent polarity was insufficient.

Figure 4:
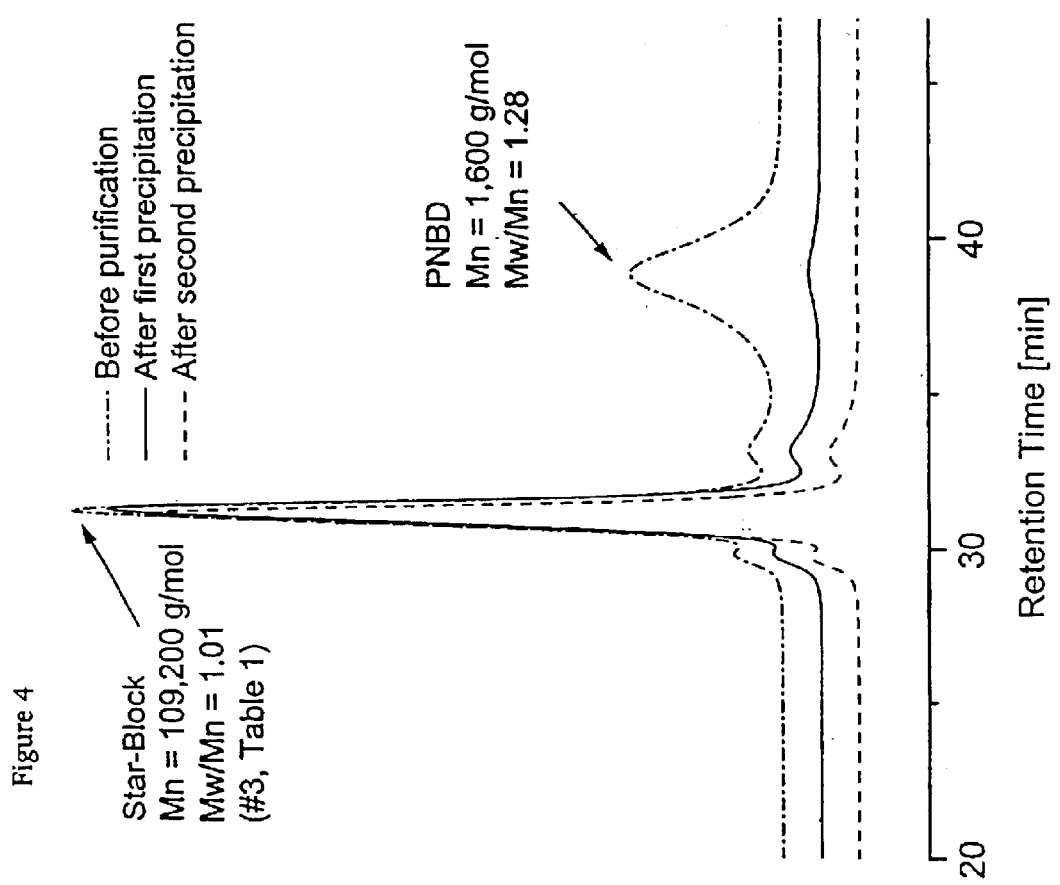
FIG. 4 shows GPC traces of tCum(PIB-b-PNBD)$_3$ with PNBD contaminant (RI-detector)

FIG. 4 shows GPC traces of the products obtained in Expt 3 of Table 1. In addition to the main peak at ~31 min associated with the sought star-block, the peak at ~39 min indicates the presence of PNBD homopolymer ($\overline{M}_n$~1,600 g/mol $\overline{M}_w/\overline{M}_n$=1.28; RI-detector, linear PIB standards) most likely formed by chain transfer. As suggested by the traces in the figure, most of the homopolymer can be removed by precipitation (from THF into ice-cold 1,2-dichloroethane), and essentially uncontaminated star block can be obtained after two precipitations.

Figure 2:
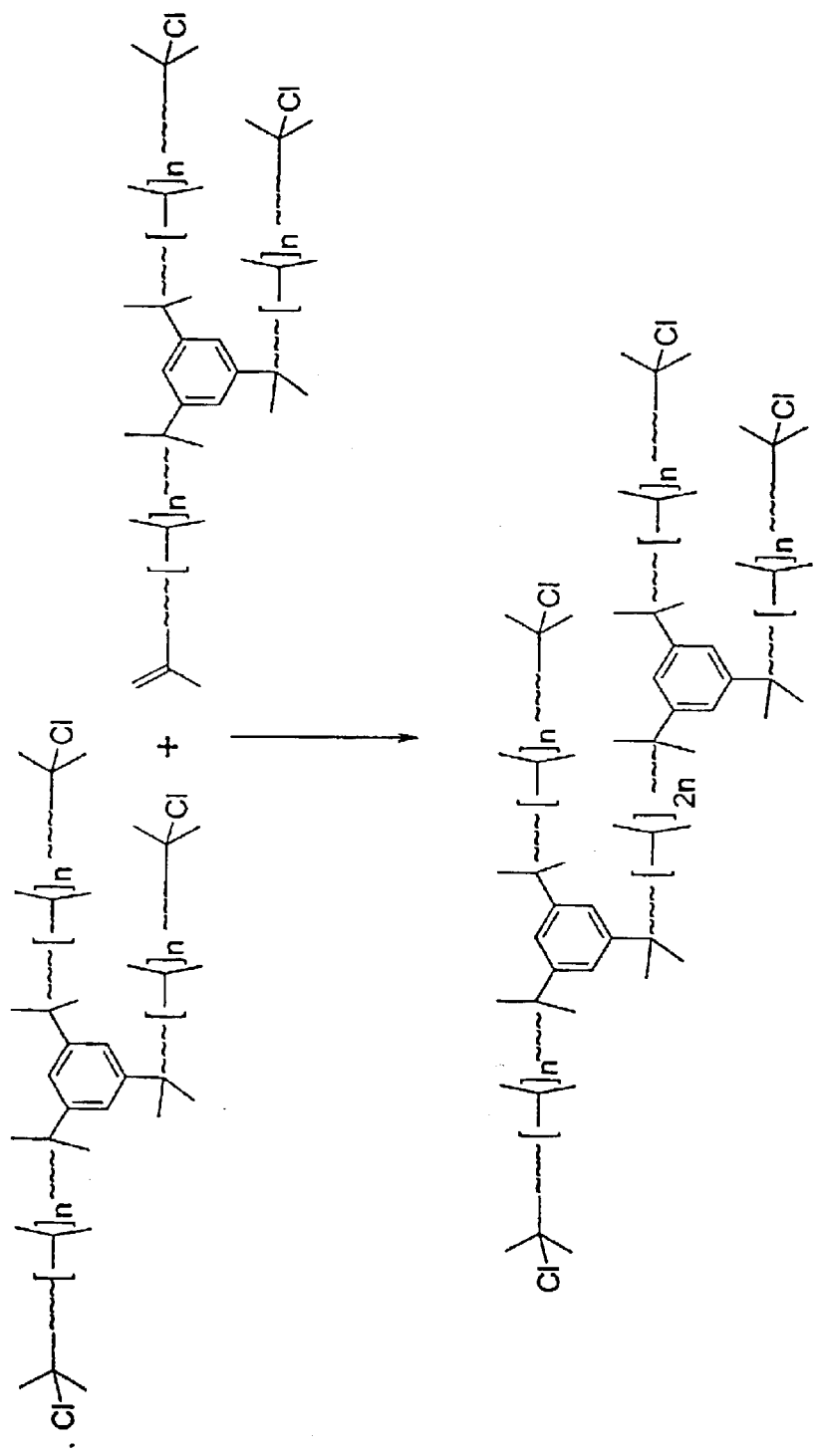
FIG. 2 is a synthesis strategy for star/star coupling

The shoulder at ~29 min indicates the presence of a small amount of a species of $\overline{M}_n$≠206,000 g/mol, i.e., about double that of the prepolymer. This species most likely arose by star/star coupling by the route shown in FIG. 2. In this process a growing arm intramolecularly cationates an arm of another star with a —CH₂—C(CH₃)=CH₂ terminus formed by chain transfer (i.e., dehydrochlorination) of a —CH₂C (CH₃)₂Cl terminus. Such star/star coupling reactions have been observed as disclosed by Jacob, S.; Majoros, I.; Kennedy, J. P.; *Polym. Bull*, 1998, 40, 127 and Jacob, S.; Kennedy, J. P.; *Adv. Polym. Sci.*, 1999, 146, 1; both of which are incorporated by reference. The very small hump centered at ~33 minutes (~43,000 g/mol) may be due to a very small amount of product formed by premature chain breaking during star formation.

Figure 5:
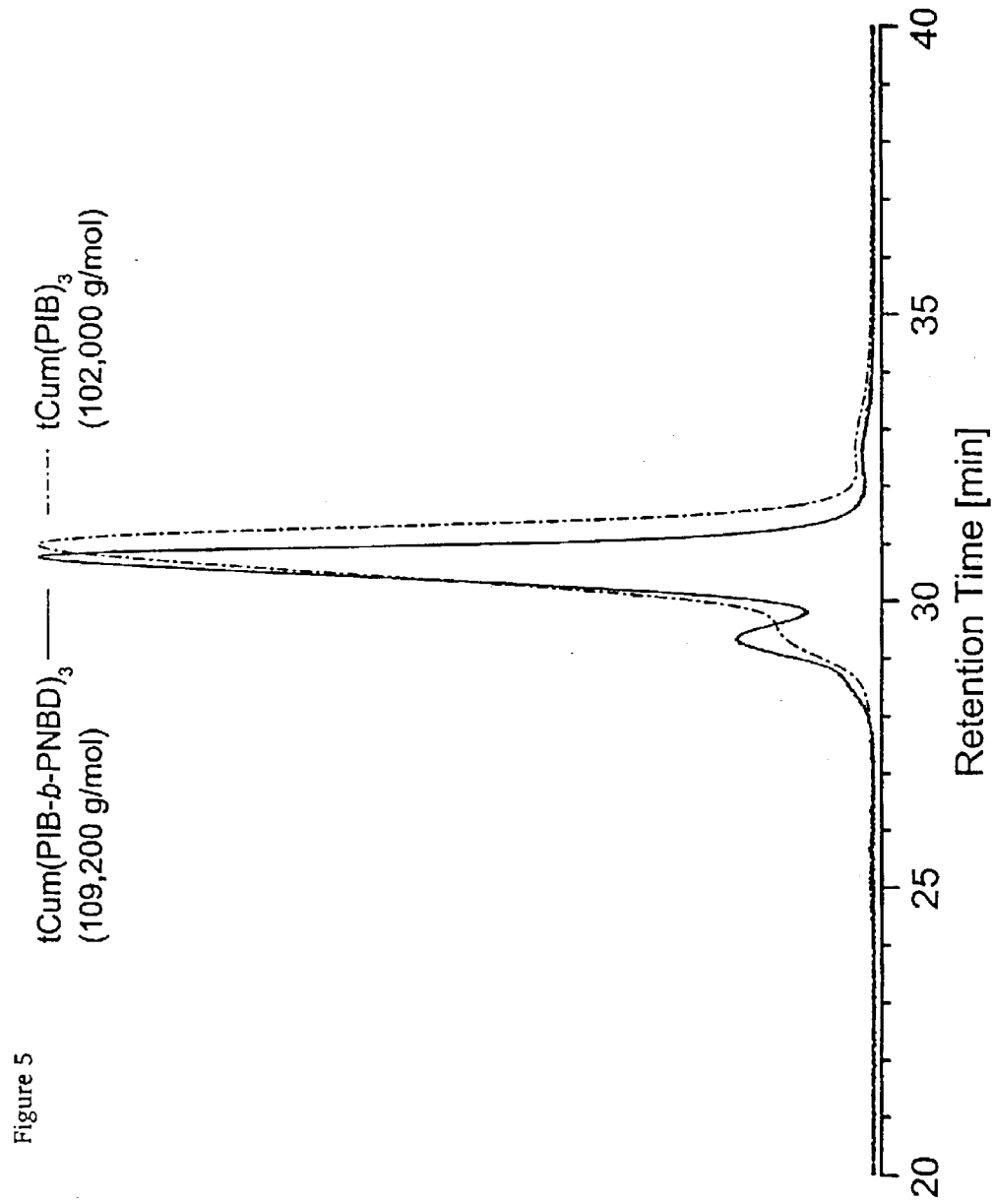
FIG. 5 shows GPC traces of tCum(PIB)$_3$ and tCum(PIB-b-PNBD)$_3$ (#3, Table 1; LLS-detector)

FIG. 5 shows the GPC trace of a prepolymer together with the corresponding star-block (PNBD removed). The small but distinct shift of the peak associated with the prepolymer toward lower elution counts after blocking with NBD (i.e., from ~30.8 to 30.5 min) indicates blocking of a small amount of PNBD. The position of the peak due to the prepolymer suggests $\overline{M}_n$=102,000 k/mol, $\overline{M}_w/\overline{M}_n$=1.03 (LLS-detector). In line with this GPC analysis the arm molecular weight of the prepolymer is ~34,000 g/mol.

In FIG. 5, the position of the peak due to the star-block suggests ($\overline{M}_n$~109,200 g/mol, $\overline{M}_w/\overline{M}_n$=1.03). The small peak and the shoulder at ~29 min are due to star/star coupling (see above). This peak is more pronounced than the shoulder because the extent of star/star coupling was higher with the star-block than with the prepolymer. This difference is due to the much longer reaction times needed for blocking PNBD than those for preparing the prepolymer. Indeed, the long blocking times resulted in further star/star blocking and led to the formation of a very high molecular weight fraction suggested by the slight shoulder at ~28.5 minutes.

The molecular weight increase from the prepolymer to the star-block is ~7,200 g/mol which is equivalent to an increase of ~2,400 g/mol per arm in the star-block. The latter value is comparable to the molecular weight of the PNBD homopolymer contaminant. Thus GPC analysis suggests a star block consisting of $\overline{M}_{n,PIB}$=34,000 and $\overline{M}_{n,PNBD}$=2,400 g/mol per arm.

NMR Spectroscopy

Figure 6:
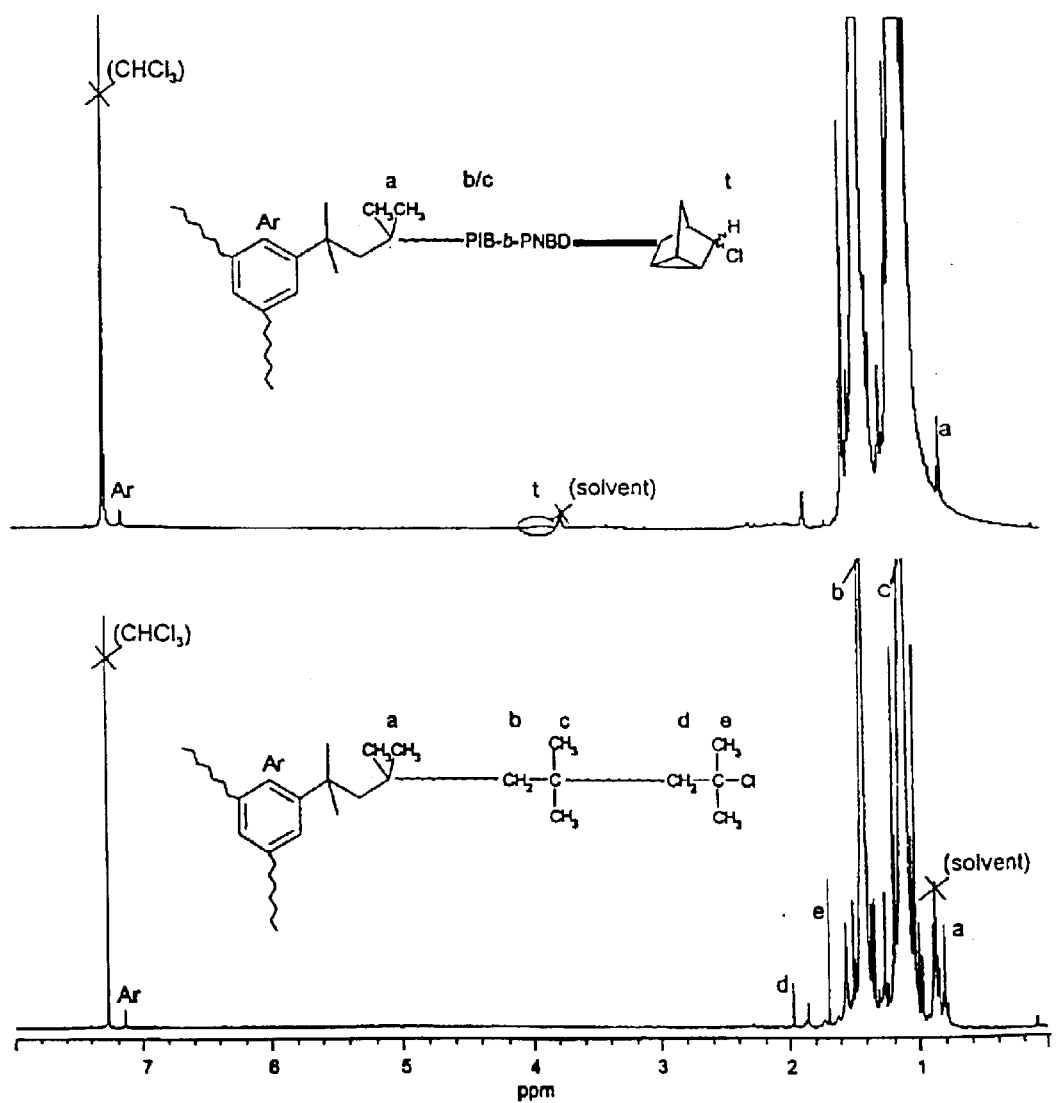
FIG. 6 shows $^1$H-NMR-Spectra of tCum(PIB-Cl$^{sec}$)$_3$ and tCum(PIB-b-PNBD-Cl$^{sec}$)$_3$ together with assignments (750 MHz, CDCl$_3$; star-block #3 in Table 1)

The microstructure of tCum(PIB-b-PNBD-Cl)₃ was investigated by NMR spectroscopy. FIG. 6 shows the ¹H-NMR spectrum of a representative star-block and of the prepolymer, together with assignments.

The high resolution allowed the detection and quantitative analysis of the aromatic initiator fragment and chlorine-containing tail-groups in both the prepolymer and the star-block, despite their relatively high $\overline{M}_n$'s. It was possible to calculate molecular weights from this ¹H-NMR spectrum.

In the prepolymer, the resonance Ar at δ=7.14 ppm is due to the three aromatic protons of the cumyl initiator fragment. The six (per arm) methyl protons (a) resonate at δ=0.81 ppm. The terminal methyl and methylene protons (e and d) resonate at δ=1.70 and δ=1.98 ppm. It is impossible to assign signals for the methyl protons of the tricumyl core and the adjacent methylene units, because their resonances are too near the large resonances from the methylene and methyl protons (b and c) of the IB repeat units.

In the star-block, the PNBD terminus is a tricyclic structure with a chlorine in the 3 position. The proton adjacent to this Cl may be in exo or endo position with signals appearing in the δ=3.8–4.0 ppm range. While the signals are, of course, weak and do not allow exo/endo resolution, they are clearly discernible.

The ratio of the integrals $$\frac{\int t}{\int Ar}$$

should be unity (i.e., three protons in the aromatic initiator fragment relative to the terminal protons of the three arms). The experimental value is 1.4, which is remarkable in view of the multiplicity of the signals for t and the relatively low concentrations of the groups.

The resolution of the spectra is sufficient to obtain molecular weights by integration. The molecular weight of the prepolymer was determined by $$\overline{M}_{n_{prepolymer}} = \overline{M}_{n_{tCumCl}} + \left(\frac{\int Mxn_{H,Ar}}{\int Arxn_{H,b}}\right) xM_{ntB}$$

where $\overline{M}_n$ is molecular weight and n the number of protons in the structural unit associated with a peak (e.g. $n_{H,b}$=2). According to our analysis $M_{n_{prepolymer}}$~103,900 g/mol which indicates 34,500 g/mol per prepolymer arm.

The $M_n$ of the star-block was calculated by $$M_{n,\text{star-block}} = M_{n,\text{prepolymer}} + \frac{\left(\dfrac{\int Al}{\int Ar}\right)_{\text{star-block}} xn_{H,Ar} - \left(\dfrac{\int Mxn_{H,Ar}}{\int Arxn_{H,b}}\right)_{\text{prepolymer}} xn_{H,tB}}{n_{H,NBD}} \times M_{NBD}$$

where Al is the sum of aliphatic resonances between 0.5 and 1.8 ppm. $\overline{M}_{n_{\text{star-block}}}=110{,}100$ g/mol for the tCum(PIB-b-PNBD-Cl)$_3$ under investigation. The molecular weight increase of 6,200 g/mol relative to the prepolymer suggests an average of ~2,100 g/mol PNBD per arm in the star-block.

Thus, according to this analysis, quantitative NMR spectroscopy indicates a three-arm star-block consisting of a tricumyl core out of which emanate three PIB-b-PNBD-Cl$^{sec}$ branches composed of $\overline{M}_{n\,PIB}=34{,}500$ and $\overline{M}_{n\,PNBD}=2{,}100$ g/mol, abbreviated by tCum(PIB(34.5K)-b-PNBD(2.1K)-Cl$^{sec}$)$_3$.

The molecular weights determined by proton NMR spectroscopy are in excellent agreement with those determined by GPC, i.e., $\overline{M}_{n_{\text{prepolymer}}}=103{,}900$ and 102,000 g/mol, and $\overline{M}_{n_{\text{prepolymer}}}=110{,}100$ and 109,200 g/mol, respectively.

Thermal Characterization

Figure 7:
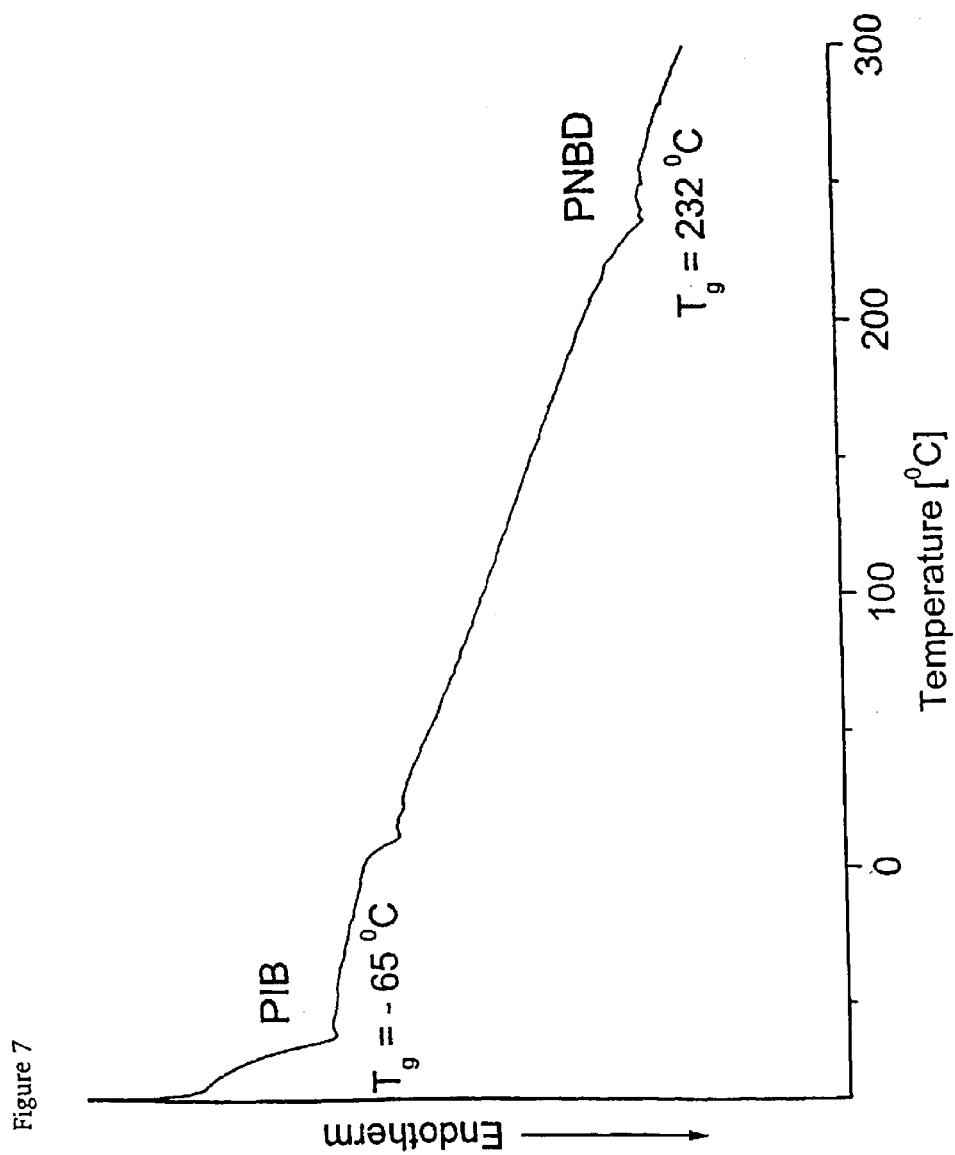
FIG. 7 shows DSC Thermogram of tCum(PIB-b-PNBD)$_3$ (M$_n$ 109,200 g/mol by GPC-LLS; second heating)

FIG. 7 shows a representative DSC thermogram of tCum(PIB(34.5K)-b-PNBD(2.1K))$_3$. The transition at −65° C. is due to the PIB phase and that at −232° C. is associated with the glassy PNBD domains. The transition at −0° C. is most probably due to moisture. The presence of the two transitions indicates phase separation which is remarkable in view of the relatively low molecular weight of the PNBD segments.

With the Fox-Flory realationship, the $T_g$~232° C. for the PNBD in the star-block corresponds to $T_g$~1,620 g/mol. This value is somewhat lower than those calculated from NMR and GPC data (i.e., NMR gives 253° C. for (Mn 2,100 g/mol); GPC gives 263° C. for ($\overline{M}_n$~2,400 g/mol).

Figure 8:
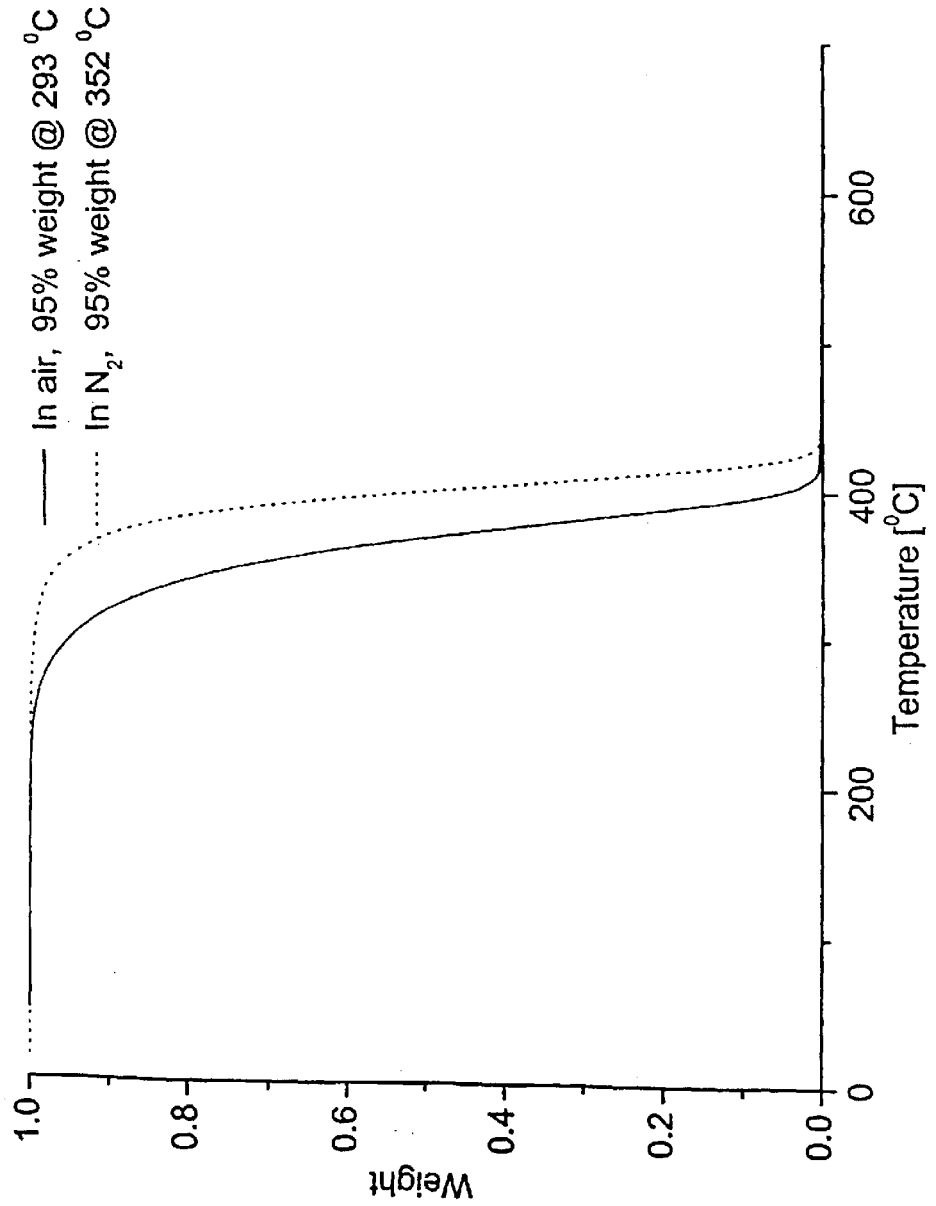
FIG. 8 shows TGA Thermograms of tCum(PIB(24.5K)-b-PNBD(2.1K))$_3$ in air and N$_2$

In view of the novel structure of the star-block synthesized, we were interested to characterize its thermal degradation. FIG. 8 shows TGA thermograms obtained in nitrogen and air of a star-block.

In both cases, degradation starts at 225° C. In $N_2$ and air 5% weight loss is reached at 352° C. and 293° C., respectively. At 500° C. the samples decomposed without char formation.

Synthesis and Characterization of tCum(PNBD-b-PIB)$_3$

Figure 3:
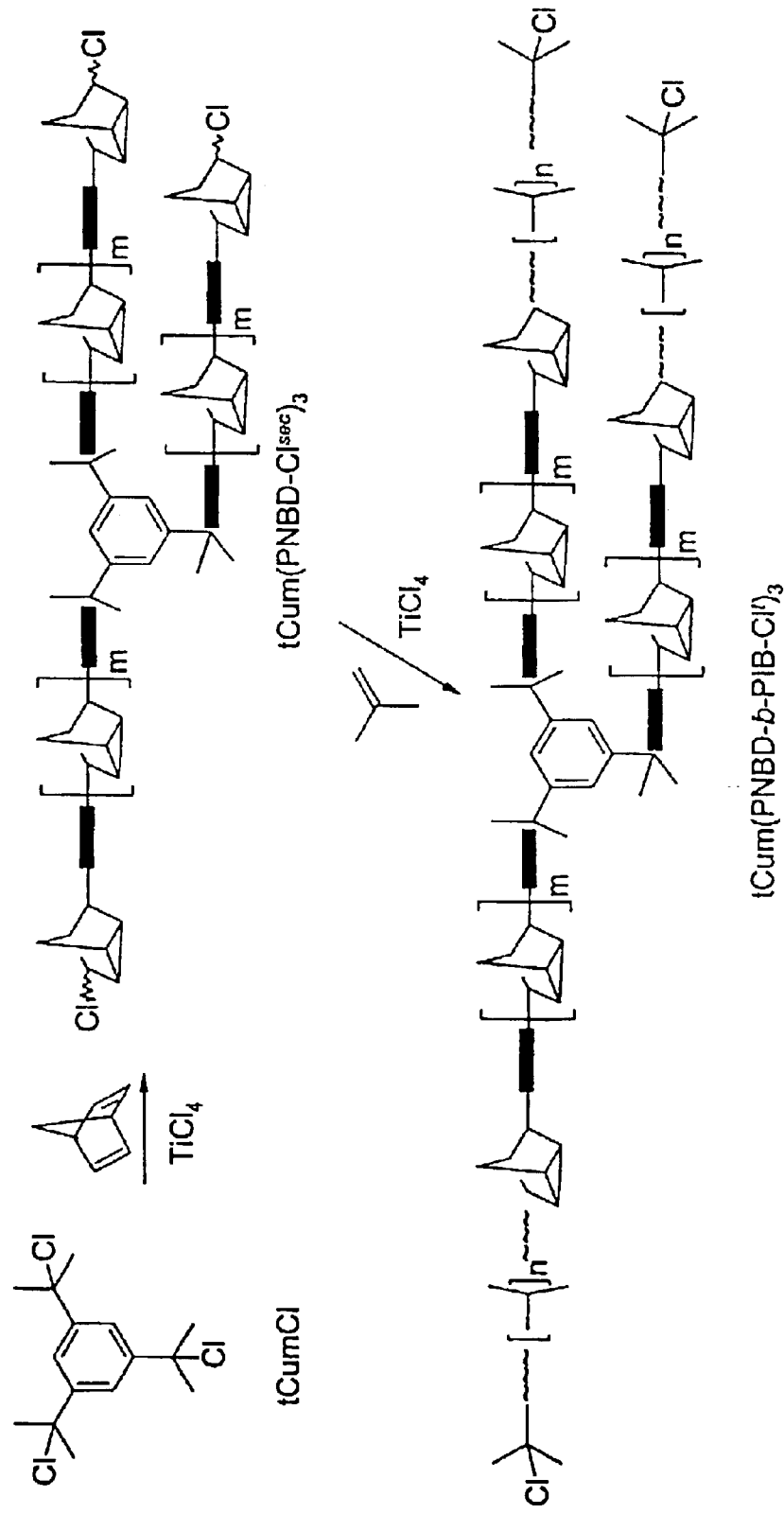
FIG. 3 is a synthesis strategy for tCum(PNBD-b-PIB)$_3$

FIG. 3 outlines the steps generally involved in the synthesis of tCum(PNBD-b-PIB)$_3$. The strategy was essentially the same as that used for the synthesis of tCum(PIB-b-PNBD)$_3$, except the sequence of blocking was reversed. Initiation of NBD polymerization was effected by the tCumCl/TiCl$_4$ combination and, subsequently, the tCum(PNBD-Cl)$_3$ prepolymer was used, in conjunction with TiCl$_4$, to induce the polymerization of IB. The final tri-arm star block was characterized by $^1$H-NMR spectroscopy, GPC and DSC.

Synthesis

The first step of the synthesis was the preparation of the three-arm star tCum(PNBD-Cl)$_3$ prepolymer. On the basis of experience with the TMPCl/TiCl$_4$ system, we expected and indeed found that tCumCl readily induces NBD polymerization in the presence of TiCl$_4$. The resulting tCum(PNBD-Cl)$_3$ showed ($\overline{M}_n\overline{M}_n$~2,900 g/mol) (RI-detector, against PIB standards). The second step, the blocking of IB from the tCum(PNBD-Cl$^{sec}$)$_3$ terminus, also proceeded with ease. It is of interest that this sec-chlorine mediates IB polymerization because the structurally similar isopropyl chloride is an inefficient initiator under similar conditions. The ease of initiation with tCum(PNBD-Cl)$_3$ is most likely due to the strained tricyclic structure.

Figure 9:
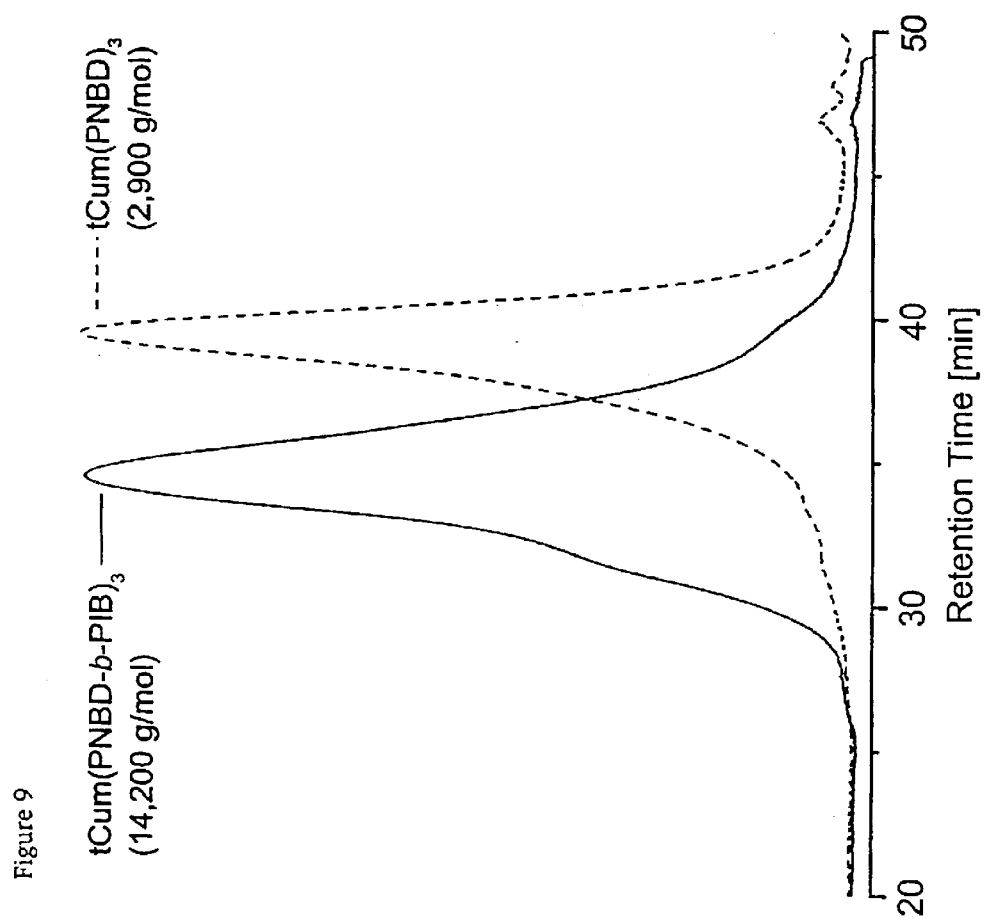
FIG. 9 shows GPC traces of tCum(PNBD)$_3$ and tCum(PNBD-b-PNBD)$_3$ (RI detector, against PIB standards)

FIG. 9 depicts the GPC traces of the prepolymer tCum(PNBD-Cl$^{sec}$)$_3$ and the star-block tCum(PNBD-b-PIB-Cl$^t$)$_3$. The molecular weights $\overline{M}_n\overline{M}_n$ of the prepolymer and the star block are 2,900 g/mol ($\overline{M}_w/\overline{M}_n$~1.93) and 14,200 g/mol ($\overline{M}_w/\overline{M}_n$~1.99), respectively. These data suggest 900 g/mol per inner PNBD arm and 3,800 g/mol per outer PIB arm: tCum(PNBD(0.9K)-b-PIB(3.8K))$_3$. The shoulder at 39 min is probably due to unreacted prepolymer, while the shoulders at 33 and 29 min indicate star/star coupling.

NMR Spectroscopy

Figure 10:
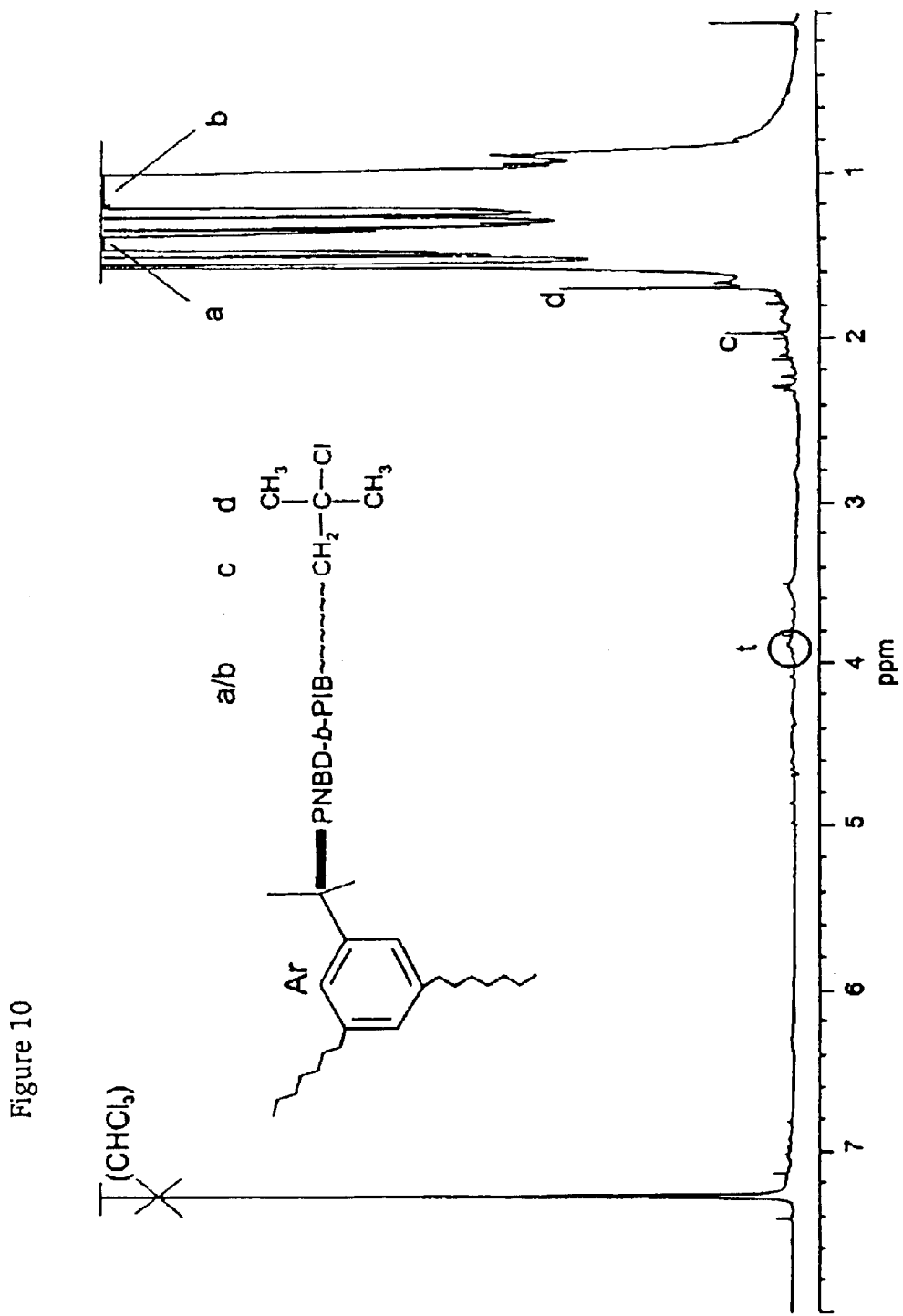
FIG. 10 shows $^1$H-NMR Spectrum of a star-block tCum(PNBD(0.9K)-b-PIB(3,8K))$_3$ (750 MHz, CDCl$_3$)
Figure 11:
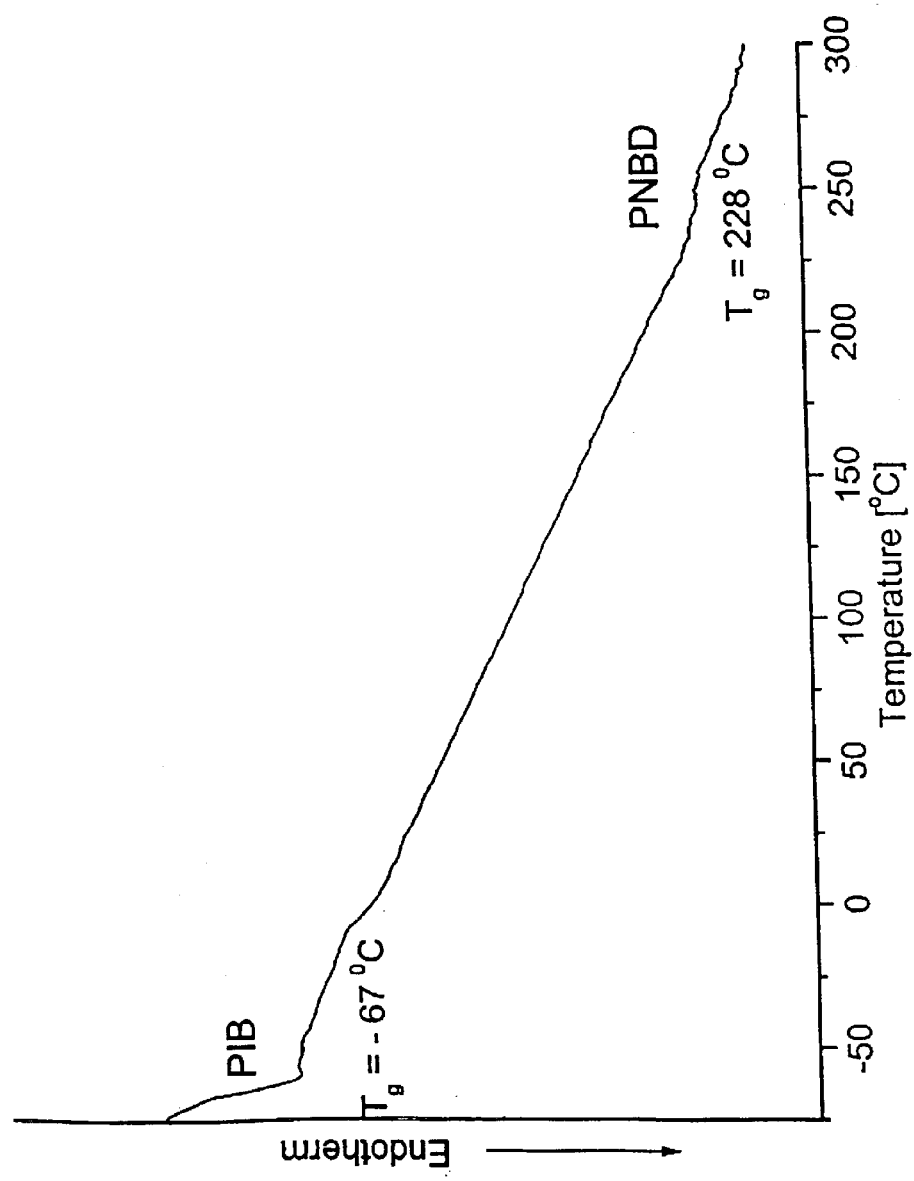
FIG. 11 shows DSC Thermogram of tCum(PNBD-b-PIB)$_3$ (M$_n$ 14,200 g/mol by GPC-RI; second heating)

FIG. 10 depicts the $^1$H-NMR spectrum of the star-block, together with relevant assignments. The resonances at δ=1.98 and 1.68 ppm (c and d) indicate the presence of the terminal methylene and methyl protons, respectively. The PNBD segments are not resolved under the dominating methyl and methylene signals (a and b) of the PIB segments but base broadening of these signals (in the 0.8–1.8 ppm range) clearly suggests the presence of PNBD. The signal for the aromatic protons (Ar) is not resolved either, despite the high magnetic field applied. The rigid PNBD segments may cause signal broadening by strain on the core as suggested by signal intensity in the 7.1–7.25 ppm range. The presence of a weak broad signal (t) at d~3.9 ppm is due to unreacted PNBD chain ends (for a detailed analysis see above) and suggests inefficient initiation. The resolution of the signals is insufficient for a quantitative evaluation of the repeat structure.

Thermal Characterization

The DSC thermogram of tCum(PNBD(0.9K)-b-PIB(3,8K))$_3$ is shown in FIG. 8. It reveals two $T_g$'s, one at ~67° C., marking the rubbery PIB phase, and another at 228° C., indicating the presence of the glassy PNBD phase. With the Fox-Flory relationship (see the previous publication), the $T_g$'s, ~228° C. for the PNBD phase would correspond to $\overline{M}_n$~1,560 g/mol. It is surprising to observe this phase separation, considering that the relatively small rigid PNBD inner core would be expected to be masked by the voluminous PIB outer core.

CONCLUSIONS

Two three-arm star-block copolymers were synthesized, tCum(PIB-b-PNBD)$_3$ and tCum(PNBD-b-PIB)$_3$. The synthesis of tCum(PIB-b-PNBD)$_3$ was accomplished by developing conditions for the blocking of NBD from a well-defined tCum(PIB-Cl$^t$)$_3$ prepolymer in conjunction with TiCl$_4$. tCum(PIB(34.5K)-b-PNBD(2.1K))$_3$ exhibited a remarkably narrow dispersity (i.e., $\overline{M}_w/\overline{M}_n$ $\overline{M}_n$=10.01) and showed two $T_g$'s, indicating phase separation between the PIB and PNBD segments. The product was a non-tacky viscous material, most likely because the PNBD segments were too short. We discovered that PNBD-Cl$_3$ terminus, in the presence of TiCl$_4$, efficiently initiates the polymerization of IB. The discovery led to the synthesis of tCum(PNBD(0.9K)-b-PIB(3.8K))$_3$, a product that also showed two TS's.

What is claimed is:

1. A block copolymer comprising:

a first polymer segment of polyisobutylene; and a second polymer segment of a polycycloaliphatic diene polymer.

2. The block copolymer of claim 1, wherein said polycycloaliphatic diene polymer is polynorbornadiene.

3. A star block copolymer comprising:
   an core component; and
   N number of arms connected to said core component, wherein each arm is a block copolymer having a polyisobutylene segment and a polycycloaliphatic diene polymer segment and wherein all of said arms are the same.

4. The star block copolymer of claim 3, wherein said core component is selected from the group consisting of a dicumyl group, a tricumyl group, and a calix[n]arene where n=4 to 16,
   wherein N=2 when said core component is said dicumyl group,
   wherein N=3 when said core component is said tricumyl group, and
   wherein N=n when said core component is said calix[n]arene.

5. The star block copolymer of claim 3, wherein said polycycloaliphatic diene polymer is polynorbornadiene.

6. The star block copolymer of claim 4, wherein said core component is said tricumyl group.

7. A process of synthesizing a star block copolymer comprising the steps of:
   forming an inner block by cationic polymerization of either isobutylene monomer or polycycloaliphatic diene monomer from a multifunctional initiator; and
   form ing an outer block, using said isobutylene monomer or said polycycloaliphatic diene monomer that was not used in forming said inner block, by cationic polymerization of said isobutylene monomer or said polycycloaliphatic diene monomer from a terminus of said inner block.

8. The process of claim 7, wherein said multifunctional initiator is selected from the group consisting of a dicumyl group, a tricumyl group, and a calix[n]arene.

9. The process of claim 7, wherein said multifunctional initiator is selected from the group consisting of dicumyl chloride, tricumyl chloride, and tert-Cl derivatives of calix[n]arene where n=4–16.

10. The process of claim 7, wherein said multifunctional initiator is selected from the group consisting of dicumyl hydroxy, tricumyl hydroxy, and tert-hydroxy derivatives of calix[n]arene where n4–16.

11. The process of claim 7, wherein said multifunctional initiator is selected from the group consisting of dicumyl methoxy, tricumyl methoxy, and tert-methoxy derivatives of calix[n]arene where n=4–16.

12. The process of claim 7, wherein said polycycloaliphatic diene monomer is norbornadiene.

13. The process of claim 7, further comprising:
   using a coinitiator for said cationic polymerization of at least one of said monomers.

14. The process of claim 13, wherein said coinitiator is a Friedel-Crafts acid.

15. The process of claim 7, wherein said cationic polymerization is conducted in the presence of a solvent selected from the group consisting of halogenated alkanes, hexanes, carbon dioxide, and mixtures thereof.

16. The process of claim 15, wherein said halogenated alkanes are chlorinated alkanes.

17. The process of claim 15, wherein said solvent is methylene chloride or methyl chloride.

* * * * *

UNITED STATES PATENT AND TRADEMARK OFFICE
CERTIFICATE OF CORRECTION

PATENT NO. : 6,852,804 B2
DATED : February 8, 2005
INVENTOR(S) : Kennedy et al.

It is certified that error appears in the above-identified patent and that said Letters Patent is hereby corrected as shown below:

Column 15,
Line 6, "an core component" should read -- a core component --
Line 28, "form ing" should read -- forming --

Column 16,
Line 16, "n4-16" ahould read -- n=4-16 --

Signed and Sealed this

Seventeenth Day of May, 2005

JON W. DUDAS
*Director of the United States Patent and Trademark Office*